United States Patent
Wolf

(10) Patent No.: US 9,199,674 B2
(45) Date of Patent: Dec. 1, 2015

(54) COOLING AIR GUIDE FOR A MOTOR VEHICLE

(75) Inventor: Thomas Wolf, Riedstadt (DE)

(73) Assignee: Dr. Ing h.c. F. Porsche Aktiengesellschaft (DE)

( * ) Notice: Subject to any disclaimer, the term of this patent is extended or adjusted under 35 U.S.C. 154(b) by 8 days.

(21) Appl. No.: 13/159,843

(22) Filed: Jun. 14, 2011

(65) Prior Publication Data

US 2012/0012411 A1    Jan. 19, 2012

(30) Foreign Application Priority Data

Jul. 16, 2010    (DE) .......................... 10 2010 036 440

(51) Int. Cl.
| | |
|---|---|
| *B60K 11/00* | (2006.01) |
| *B62D 35/00* | (2006.01) |
| *B60K 11/08* | (2006.01) |
| *B62D 35/02* | (2006.01) |

(52) U.S. Cl.
CPC .............. *B62D 35/005* (2013.01); *B60K 11/08* (2013.01); *B62D 35/02* (2013.01)

(58) Field of Classification Search
CPC ........ B60K 11/08; B60K 11/04; B60K 13/02; B60K 11/00
USPC ........... 180/68.1, 68.2, 68.3, 68.6; 123/41.05, 123/41.04, 41.62
See application file for complete search history.

(56) References Cited

U.S. PATENT DOCUMENTS

| | | | | |
|---|---|---|---|---|
| 1,979,191 | A | * | 10/1934 | Burney ........................ 180/68.1 |
| 3,205,964 | A | * | 9/1965 | Henry-Biabaud ........... 180/68.1 |
| 4,226,217 | A | * | 10/1980 | Haslbeck et al. ........... 123/41.62 |
| 4,673,206 | A | | 6/1987 | Kretschmer et al. |
| 4,706,615 | A | * | 11/1987 | Scadding ..................... 123/41.01 |
| 4,756,279 | A | * | 7/1988 | Temmesfeld ............... 123/41.04 |
| 5,269,264 | A | * | 12/1993 | Weinhold .................... 123/41.05 |
| 5,322,340 | A | * | 6/1994 | Sato et al. ..................... 180/68.2 |
| 5,526,872 | A | * | 6/1996 | Gielda et al. ................. 180/68.1 |
| 5,551,505 | A | * | 9/1996 | Freeland ....................... 180/68.1 |
| 5,626,185 | A | * | 5/1997 | Gielda et al. ................. 180/68.1 |
| 5,724,925 | A | * | 3/1998 | Ito ................................. 180/68.1 |
| 6,390,217 | B1 | * | 5/2002 | O'Brien et al. .............. 180/68.6 |
| 6,622,807 | B2 | | 9/2003 | Preiss |
| 7,497,287 | B2 | * | 3/2009 | Kunikata et al. ............. 180/68.1 |
| 8,347,830 | B2 | * | 1/2013 | Tregnago et al. .......... 123/41.05 |
| 2004/0124022 | A1 | | 7/2004 | Schmid et al. |

FOREIGN PATENT DOCUMENTS

| | | |
|---|---|---|
| DE | 4317769 | 1/1994 |
| DE | 102 42 788 | 3/2004 |
| EP | 0213387 | 3/1987 |
| EP | 100 48 531 | 4/2002 |

OTHER PUBLICATIONS

French Patent Appl. No. 1156214—Search Report issued Apr. 12, 2014.

* cited by examiner

*Primary Examiner* — Hau Phan

(74) *Attorney, Agent, or Firm* — Gerald E. Hespos; Michael J. Porco; Matthew T. Hespos

(57) ABSTRACT

An outlet air guide is formed between a front skirt and a body shell undersurface of a vehicle. The guide has at least one outlet opening having an outlet gap configured so that an outlet air flow can be guided out parallel to the undersurface from a radiator.

12 Claims, 3 Drawing Sheets

COOLING AIR GUIDE FOR A MOTOR VEHICLE

CROSS REFERENCE TO RELATED APPLICATION

This application claims priority under 35 USC 119 to German Patent Application No 10 2010 036 440.1 filed on Jul. 16, 2010, the entire disclosure of which is incorporated herein by reference.

BACKGROUND OF THE INVENTION

1. Field of the Invention

The invention relates to a cooling air guide for a motor vehicle.

2. Description of the Related Art

DE 100 48 531 C1 discloses a cooling air guide for a motor vehicle that has a radiator in a front end region of the vehicle and through which cooling air flows. The outlet air flow that emerges from the radiator is guided under the motor vehicle through outlet openings arranged on the undersurface of the motor vehicle. The outlet openings can be covered by an air guiding element that forms a separate component from the floor panel and has a guide surface. DE 102 42 788 A1 discloses a motor vehicle with a cooling air guide in which a radiator is arranged in an air guide duct and a radiator air outflow opening is provided downstream of the radiator in the air guide duct. The radiator outlet air emerges downward through the opening perpendicularly to the roadway.

It is the object of the invention to provide a cooling air guide in the front end of a motor vehicle that is of simple construction, has a small number of components and is distinguished by aerodynamically advantageous guidance of the outlet air to the undersurface.

SUMMARY OF THE INVENTION

The invention provides an outlet air guide at a front end of a motor vehicle without additional components. This is achieved by forming an outlet air guide between a front skirt and a body shell undersurface of the vehicle. The guide comprises at least one outlet opening having an outlet gap oriented so that the outlet air flow can be guided out substantially parallel to the undersurface. The outlet air guide can be incorporated into the existing front skirt with the body shell undersurface of the vehicle. There are no additional components that require attachment. The outlet air guide achieves simplicity of construction with the already existing components and hence avoids additional weight and additional costs.

The invention may include first and second air guide ducts. The first air guide duct is arranged in the front skirt in front of the radiator as seen in relation to the direction of travel. The second air guide duct is arranged downstream behind the radiator and narrows in a nozzle shape as far as the outlet gap. Bringing the rear free end of the bottom part of the front skirt close to the body shell undersurface results in a narrowing up to the outlet gap and hence gives rise to the nozzle. As a result, the radiator outlet air is accelerated and diverted parallel to the undersurface of the vehicle and can be mixed into an undersurface flow with little resistance. This is an effective way of reducing vehicle resistance and front axle lift.

The outlet gap between the body shell and the front skirt may comprise a rectangular embossed feature on the underside of the front skirt. The embossed feature may comprise a tray of u-shaped cross section that projects down. The embossed feature may be integral with the front skirt and may extend at least over the entire width of the radiator in the air guide duct. This embodiment also uses no additional components apart from the existing front skirt, which is deformed or formed in this area to give the outlet gap.

The outlet gap between the body shell undersurface and the front skirt may comprise two triangular embossed features on the underside of the front skirt. These features are situated in a transverse plane and are connected to the body shell in the center of the front section by way of an upward-projecting offset and can be fastened to the body shell undersurface by a bolted joint or the like at free outer ends. The triangular embossed features form an outlet gap that has a large area in the center of the front section relative to the regions at the free outer ends. The front skirt is offset downward in an appropriate manner to form the two triangular outlet gaps, and the underside of the front skirt thus forms the outside of the two outlet gaps.

The outlet gap may be provided in the front skirt or the front panel. Cutting the front panel is a simple way of creating the outlet gap or the outlet opening for the radiator outlet air. The opening preferably is situated in a horizontal plane.

The front skirt and the body shell undersurface form an outlet gap with a width that extends at least over the width of the radiator and a height that is significantly less than the width. The outlet gap narrows as a nozzle as far as the outlet gap in the air guide duct arranged downstream of the radiator. The overall result is that an adequate means of discharging the radiator outlet air is achieved and, at the same time, this outlet air is guided aerodynamically outward, essentially parallel to the undersurface, in such a way that there is no possibility of an increase in front axle lift and resistance.

Illustrative embodiments of the invention are depicted in the drawings and are described in greater detail below.

DETAILED DESCRIPTION OF THE PREFERRED EMBODIMENTS

Figure 1:
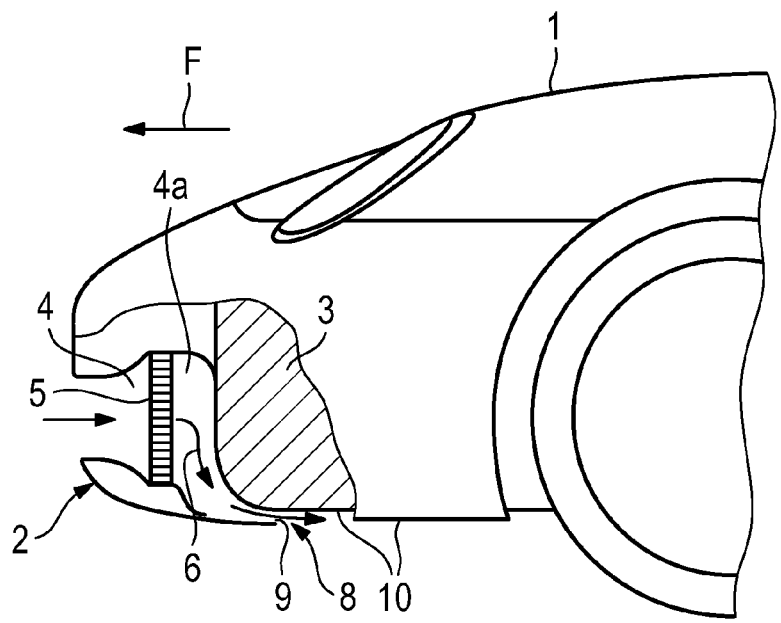
FIG. 1 is a partially sectioned side view of a front end of a motor vehicle having an air guide duct for guiding cooling air.
Figure 2:
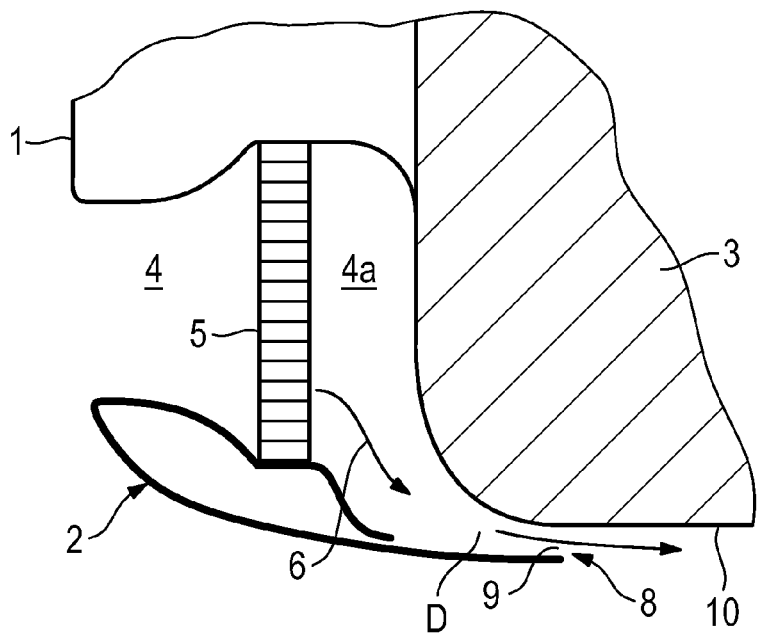
FIG. 2 is an enlarged illustration of the cooling air guide shown in FIG. 1.

A motor vehicle 1 in accordance with the invention has a front skirt 2 and a vehicle body 3. First and second air guide ducts 4, 4a are arranged between the front skirt 2 and the vehicle body 3 and a radiator 5 is arranged between the first and second air guide ducts 4, 4a. An outlet air flow 6 that emerges downstream from the radiator 5 is guided under the vehicle 1 to the body shell undersurface 10 of the vehicle body 3 through an outlet opening 8.

The first air guide duct 4 is arranged in the front skirt 2 in front of the radiator 5 as seen in relation to the direction of travel F. The second air guide duct 4a is arranged in an adjoining downstream position behind the radiator 5 and narrows into a nozzle D toward the outlet gap 9.

Figure 3:
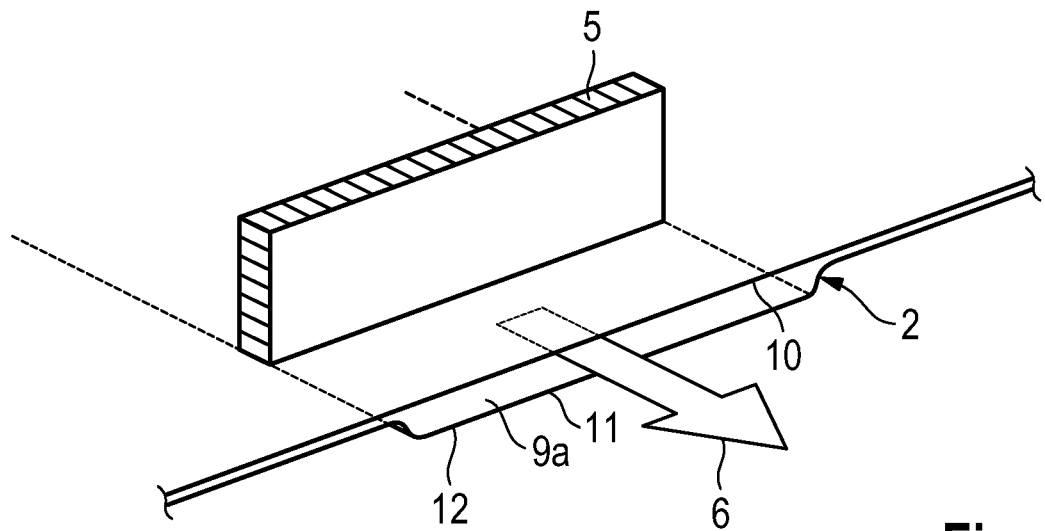
FIG. 3 is a first embodiment of a cooling air guide in the front end of the motor vehicle, having a rectangular outlet cross section for the radiator outlet air.

According to a first embodiment, as shown in FIG. 3, the outlet gap 9a between the body shell undersurface 10 and the front skirt 2 has a rectangular embossed feature 11 on the underside 12 of the front skirt. This embossed feature 11 preferably comprises a tray of u-shaped cross section that projects down and is integral or unitary with the front skirt 2. The embossed feature 11 and hence the outlet gap 9a extends at least over the entire width of the radiator 5.

Figure 4:
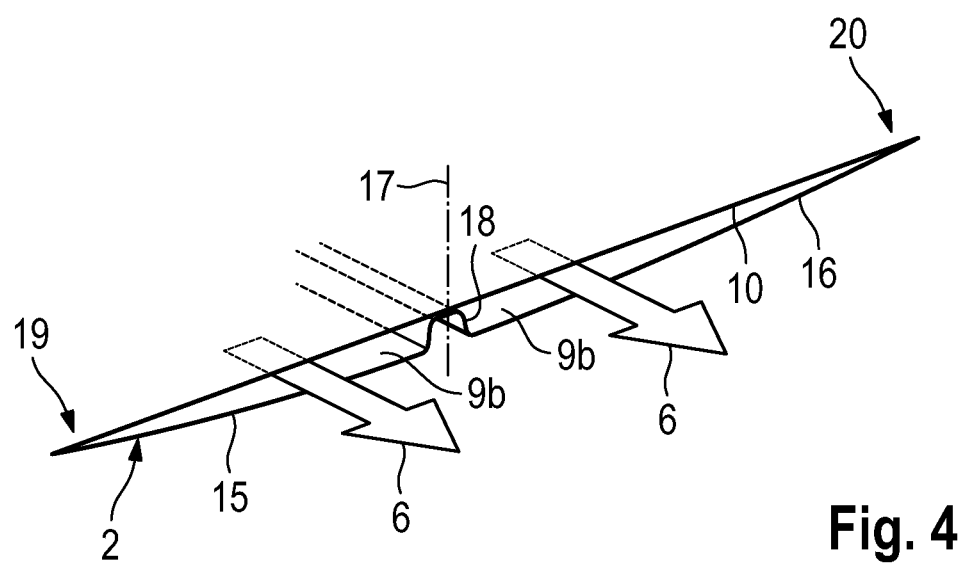
FIG. 4 is a second embodiment having triangular outlet cross sections for the radiator outlet air.

FIG. 4 shows another embodiment where the outlet gap 9b between the body shell undersurface 10 and the front skirt 2 consists of two triangular embossed features 15, 16 on the underside of the front skirt 2. The features 15, 16 are situated in a common transverse plane. The embossed features 15, 16 are connected to the body shell undersurface 10 in the center 17 of the front section, preferably by a bolted joint through an upward-projecting offset 18, the design of which is like that of a tunnel element. The free ends 19, 20 of the embossed features 15, 16 also are connected to the body shell undersurface 10 by a bolted joint or the like. The triangular embossed features 15, 16 to form an outlet gap 9b with a larger area in the center 17 of the front section and an outlet gap 9b with a smaller area at the free ends 19, 20.

Figure 5:
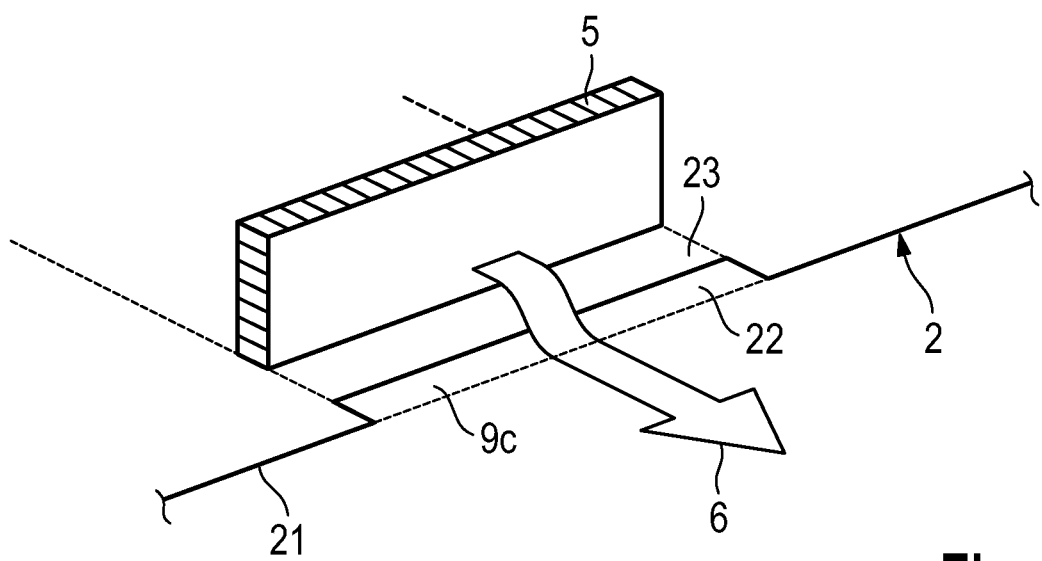
FIG. 5 is a third embodiment having a rectangular outlet cross section consisting of an opening in the front panel.

FIG. 5 shows another embodiment where the outlet gap 9c is provided at the underside 12 of the front skirt 2 and consists of a rectangular opening 22 in the front panel 23. This opening 22 preferably is achieved by cutting the front skirt 2. The opening 22 is arranged horizontally and has a width corresponding to the width of the radiator 5.

The invention ensures that the front skirt 2 forms an outlet gap 9; 9a; 9b; 9c with the body shell undersurface 10 with an outlet cross section, the width of which extends at least over the width of the radiator 5 and the height of which is significantly less than the width. The air guide duct 4a extending downstream of the radiator 5 is narrowed to define a nozzle D as far as the outlet gap 9; 9a; 9b; 9c.

What is claimed is:

1. A cooling air guide for a motor vehicle, comprising:
a transverse radiator arranged in a front end region of the vehicle;
a body opposed to an upper part of the radiator and forming an upper part of a first air duct in the front end region of the vehicle forward of the radiator and an upper part of a second air duct rearward of the radiator, the body including a substantially horizontal downwardly facing body shell undersurface rearward of the second air duct; and
a front skirt mounted in the front end region of the vehicle and opposed to a lower part of the radiator, the front skirt including:
a front section forward of the radiator and having an upper surface forming a lower part of the first air duct;
a rear section unitary with the front section and extending continuously rearward from the front section to a position rearward of the radiator and below and parallel to a front part of the body shell undersurface so that an upper surface of the rear section of the front skirt is opposed to and spaced below the body shell undersurface and forms a lower part of the second air duct; and
at least one outlet gap formed between the body shell undersurface and the upper surface of the rear section of the front skirt, the outlet gap being configured and disposed for guiding the outlet air flow out from the second air duct substantially horizontally and parallel to the body shell undersurface, and wherein no components other than the front skirt form the lower parts of the first and second air ducts.

2. The cooling air guide of claim 1, wherein the outlet gap between the body shell undersurface and the front skirt comprises a rectangular embossed feature on an underside of the front skirt and integral with the front skirt, said embossed feature defining a tray of u-shaped cross section projecting down and extending at least over an entire width of the radiator in the air guide duct.

3. The cooling air guide of claim 1, wherein the outlet gap between the body shell undersurface and the front skirt comprises two triangular embossed features on the underside of the front skirt, said features being situated in a transverse plane being connected to the body shell undersurface in a center of the front skirt by way of an upward-projecting offset and being fastened to the body shell undersurface at outer lateral ends of the triangular embossed features.

4. The cooling air guide of claim 3, wherein the triangular embossed features form the outlet gap with a larger area in the center of the front skirt than at the free outer ends.

5. The cooling air guide of claim 1, wherein the front skirt and the body shell undersurface form the outlet gap with a cross section having a width that extends at least over a width of the radiator and a height significantly less than the width thereof, the outlet gap narrowing as a nozzle in the air guide duct arranged downstream of the radiator.

6. The cooling air guide of claim 1, wherein an outer surface of the front skirt is uniformly convex from an entrance to the first air duct to an exit from the second air duct.

7. A motor vehicle, comprising:
a transverse radiator arranged in a front end region of the vehicle;
a body opposed to an upper part of the radiator and forming an upper part of a first air duct in the front end region of the vehicle forward of the radiator and an upper part of a second air duct rearward of the radiator, the body including a substantially horizontal downwardly facing body shell undersurface rearward of the second air duct; and
a front skirt mounted in the front end region and opposed to a lower part of the radiator, the front skirt including a front section forward of the radiator and having an upper surface forming a lower part of the first air duct for delivering a flow of cooling air to the radiator, a rear section unitary with the front section and extending continuously rearward from the front section and having an upper surface forming a lower part of the second air duct, the rear section of the front skirt extending rearward from the radiator to a position parallel to and below a front part of the body shell undersurface so that the rear section of the front skirt is opposed to and spaced below the body shell undersurface and forms a lower part of the second air duct; and
at least one outlet gap formed between the rear section of the front skirt and the body shell undersurface, the outlet gap having at least one rearwardly facing outlet opening configured and disposed for guiding the outlet air flow out from the second air duct substantially horizontally and parallel to the body shell undersurface, and wherein no components other than the front skirt form the lower parts of the first and second air ducts.

8. The motor vehicle of claim 7, wherein the outlet gap between the body shell undersurface and the front skirt comprises a rectangular embossed feature on an underside of the front skirt and integral with the front skirt, said embossed feature projecting down and extending at least over an entire width of the radiator.

9. The motor vehicle of claim 7, wherein the outlet gap between the body shell undersurface and the front skirt comprises two triangular embossed features on the underside of the front skirt, said features being situated in a transverse plane and being connected to the body shell undersurface at an upward-projecting offset in a center of the front skirt and at outer lateral ends of the triangular embossed features.

10. The motor vehicle of claim 9, wherein the triangular embossed features form the outlet gap with a larger area in the center of the front skirt than at the outer lateral ends.

11. The motor vehicle of claim 7, wherein the front skirt and the body shell undersurface form the outlet gap with a cross section having a width that extends at least over a width of the radiator and a height significantly less than the width thereof, the outlet gap narrowing as a nozzle in the air guide duct arranged downstream of the radiator.

12. The motor vehicle of claim 7, wherein an outer surface of the front skirt is uniformly convex from an entrance to the first air duct to an exit from the second air duct.

\* \* \* \* \*